(12) United States Patent
Kumagai (10) Patent No.: US 11,338,800 B2
(45) Date of Patent: May 24, 2022

(54) VEHICLE CONTROL DEVICE

(71) Applicant: SUBARU CORPORATION, Tokyo (JP)

(72) Inventor: Hikaru Kumagai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 116 days.

(21) Appl. No.: 16/842,371

(22) Filed: Apr. 7, 2020

(65) Prior Publication Data

US 2020/0391733 A1 Dec. 17, 2020

(30) Foreign Application Priority Data

Jun. 12, 2019 (JP) .............................. JP2019-109581

(51) Int. Cl.
*B60W 30/09* (2012.01)
*B60W 10/18* (2012.01)

(52) U.S. Cl.
CPC ............ *B60W 30/09* (2013.01); *B60W 10/18* (2013.01); *B60W 2554/802* (2020.02); *B60W 2554/804* (2020.02)

(58) Field of Classification Search
CPC ................. B60W 30/09; B60W 10/18; B60W 2554/804; B60W 2554/802; B60W 30/095; B60W 10/20; B60T 2260/02; B60T 8/17558; B60T 2201/024; B60T 7/22
See application file for complete search history.

(56) References Cited

U.S. PATENT DOCUMENTS

| 2018/0151073 A1* | 5/2018 | Minemura ............ G01S 13/931 |
| 2019/0291730 A1 | 9/2019 | Kamiya et al. |
| 2021/0114591 A1* | 4/2021 | Kamiya ................ B60W 30/09 |

FOREIGN PATENT DOCUMENTS

JP 2018-097648 A 6/2018

* cited by examiner

*Primary Examiner* — Russell Frejd
*Assistant Examiner* — Ana D Thomas
(74) *Attorney, Agent, or Firm* — McDermott Will & Emery LLP (57) ABSTRACT

A vehicle control apparatus includes a time-to-collision acquisition unit that acquires time to collision that is a time period until a time of collision of an own vehicle with a front obstacle, an overlap rate acquisition unit that acquires an overlap rate indicating a relative positional relationship between the own vehicle and the front obstacle in a lateral direction perpendicular to a traveling direction of the own vehicle, a determination unit that performs execution determination of automatic braking control of the own vehicle, on the basis of the time to collision and the overlap rate, and that, when the overlap rate is increasing by the front obstacle approaching the own vehicle in the lateral direction, determines start timing of the automatic braking control as earlier timing than when the overlap rate is not increasing, and an automatic controller that executes the automatic braking control at the start timing.

9 Claims, 5 Drawing Sheets

FIG. 6 ns a figure showing# VEHICLE CONTROL DEVICE

CROSS-REFERENCE TO RELATED APPLICATIONS

The present application claims priority from Japanese Patent Application No. 2019-109581 filed on Jun. 12, 2019, the entire contents of which are hereby incorporated by reference.

BACKGROUND

The technology relates to a vehicle control apparatus.

A system is known that recognizes an obstacle present around an own vehicle, and automatically avoids collision with the obstacle or assists avoidance operation by a driver. Japanese Unexamined Patent Application Publication No. 2018-097648 discloses a technique that is related to assistance of obstacle avoidance. In a case where an oncoming vehicle that has strayed from a lane to enter a traveling lane of an own vehicle is present in front of the own vehicle, the technique detects a rate of overlap (i.e., an overlap rate) between the own vehicle and the oncoming vehicle in a width direction, and determines whether notification of collision avoidance is necessary depending on the overlap rate.

SUMMARY

An aspect of the technology provides a vehicle control apparatus including a time-to-collision acquisition unit, an overlap rate acquisition unit, a determination unit, and an automatic controller. The time-to-collision acquisition unit is configured to acquire time to collision that is a time period until a time of collision of an own vehicle with a front obstacle present in front of the own vehicle. The overlap rate acquisition unit is configured to acquire an overlap rate indicating a relative positional relationship between the own vehicle and the front obstacle in a lateral direction perpendicular to a traveling direction of the own vehicle. The determination unit is configured to perform execution determination of automatic braking control of the own vehicle, on the basis of the time to collision acquired by the time-to-collision acquisition unit and the overlap rate acquired by the overlap rate acquisition unit, and to, when the overlap rate is increasing by the front obstacle becoming closer to the own vehicle in the lateral direction, determine start timing of the automatic braking control as earlier timing than when the overlap rate is not increasing. The automatic controller is configured to execute the automatic braking control at the start timing determined by the determination unit.

An aspect of the technology provides a vehicle control apparatus including a time-to-collision acquisition unit, an overlap rate acquisition unit, a determination unit, and an automatic controller. The time-to-collision acquisition unit is configured to acquire time to collision that is a time period until a time of collision of an own vehicle with a front obstacle present in front of the own vehicle. The overlap rate acquisition unit is configured to acquire an overlap rate indicating a relative positional relationship between the own vehicle and the front obstacle in a lateral direction perpendicular to a traveling direction of the own vehicle. The determination unit is configured to perform execution determination of automatic braking control of the own vehicle, on the basis of the time to collision acquired by the time-to-collision acquisition unit and the overlap rate acquired by the overlap rate acquisition unit, and to, when the overlap rate is decreasing by the front obstacle becoming farther from the own vehicle in the lateral direction, determine termination timing of the automatic braking control as earlier timing than when the overlap rate is not decreasing. The automatic controller is configured to terminate the automatic braking control at the termination timing determined by the determination unit.

An aspect of the technology provides a vehicle control apparatus including a time-to-collision acquisition unit, an overlap rate acquisition unit, a determination unit, and an automatic controller. The time-to-collision acquisition unit is configured to acquire time to collision that is a time period until a time of collision of an own vehicle with a front obstacle present in front of the own vehicle. The overlap rate acquisition unit is configured to acquire an overlap rate indicating a relative positional relationship between the own vehicle and the front obstacle in a lateral direction perpendicular to a traveling direction of the own vehicle. The determination unit is configured to perform execution determination of driving assistance control of the own vehicle, including automatic braking control and automatic steering control, on the basis of the time to collision acquired by the time-to-collision acquisition unit and the overlap rate acquired by the overlap rate acquisition unit. The automatic controller is configured to cause the driving assistance control of the own vehicle to transition from the automatic braking control to the automatic steering control, on the basis of a result of the execution determination by the determination unit. The determination unit is configured to, when the overlap rate is decreasing by the front obstacle becoming farther from the own vehicle in the lateral direction, determine transition timing from the automatic braking control to the automatic steering control as earlier timing than when the overlap rate is not decreasing.

An aspect of the technology provides a vehicle control apparatus including circuitry. The circuitry is configured to acquire time to collision that is a time period until a time of collision of an own vehicle with a front obstacle present in front of the own vehicle. The circuitry is configured to acquire an overlap rate indicating a relative positional relationship between the own vehicle and the front obstacle in a lateral direction perpendicular to a traveling direction of the own vehicle. The circuitry is configured to perform execution determination of automatic braking control of the own vehicle, on the basis of the time to collision acquired by the time-to-collision acquisition unit and the overlap rate acquired by the overlap rate acquisition unit, and to, when the overlap rate is increasing by the front obstacle becoming closer to the own vehicle in the lateral direction, determine start timing of the automatic braking control as earlier timing than when the overlap rate is not increasing. The circuitry is configured to execute the automatic braking control at the start timing determined by the determination unit.

An aspect of the technology provides a vehicle control apparatus including circuitry. The circuitry is configured to acquire time to collision that is a time period until a time of collision of an own vehicle with a front obstacle present in front of the own vehicle. The circuitry is configured to acquire an overlap rate indicating a relative positional relationship between the own vehicle and the front obstacle in a lateral direction perpendicular to a traveling direction of the own vehicle. The circuitry is configured to perform execution determination of automatic braking control of the own vehicle, on the basis of the time to collision acquired by the time-to-collision acquisition unit and the overlap rate acquired by the overlap rate acquisition unit, and to, when the overlap rate is decreasing by the front obstacle becoming farther from the own vehicle in the lateral direction, determine termination timing of the automatic braking control as earlier timing than when the overlap rate is not decreasing. The circuitry is configured to terminate the automatic braking control at the termination timing determined by the determination unit.

An aspect of the technology provides a vehicle control apparatus including circuitry. The circuitry is configured to acquire time to collision that is a time period until a time of collision of an own vehicle with a front obstacle present in front of the own vehicle. The circuitry is configured to acquire an overlap rate indicating a relative positional relationship between the own vehicle and the front obstacle in a lateral direction perpendicular to a traveling direction of the own vehicle. The circuitry is configured to perform execution determination of driving assistance control of the own vehicle, including automatic braking control and automatic steering control, on the basis of the time to collision acquired by the time-to-collision acquisition unit and the overlap rate acquired by the overlap rate acquisition unit. The circuitry is configured to cause the driving assistance control of the own vehicle to transition from the automatic braking control to the automatic steering control, on the basis of a result of the execution determination by the determination unit. The circuitry is configured to, when the overlap rate is decreasing by the front obstacle becoming farther from the own vehicle in the lateral direction, determine transition timing from the automatic braking control to the automatic steering control as earlier timing than when the overlap rate is not decreasing.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

<Configuration of Vehicle Control Apparatus>

Figure 1:
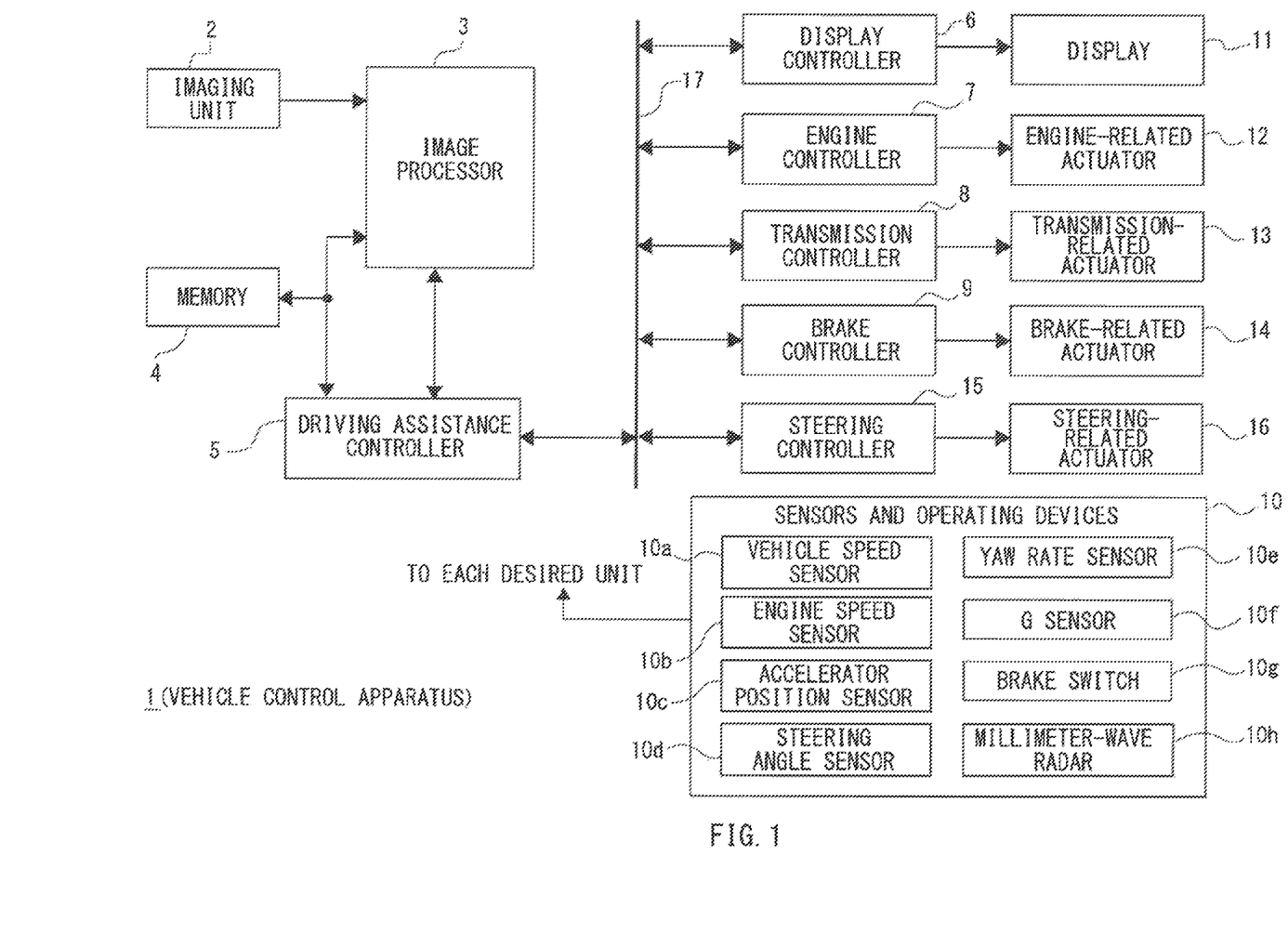
FIG. 1 is a block diagram illustrating an overall configuration of a vehicle control apparatus according to one example embodiment of the technology.

FIG. 1 is a block diagram illustrating an overall configuration of a vehicle control apparatus 1 according to an example embodiment of the technology. Of the vehicle control apparatus 1, FIG. 1 mainly illustrates a configuration of a portion that is related to driving assistance control according to the example embodiment. In one embodiment, the vehicle control apparatus 1 may serve as a "vehicle control apparatus".

The vehicle control apparatus 1 may include an imaging unit 2, an image processor 3, a memory 4, a driving assistance controller 5, a display controller 6, an engine controller 7, a transmission controller 8, a brake controller 9, sensors and operating devices 10, a display 11, an engine-related actuator 12, a transmission-related actuator 13, a brake-related actuator 14, a steering controller 15, and a steering-related actuator 16. The vehicle control apparatus 1 may be mounted on a vehicle (e.g., an own vehicle). The driving assistance controller 5 may be coupled to the display controller 6, the engine controller 7, the transmission controller 8, the brake controller 9, and the steering controller 15 related to the driving assistance controller 5, via a bus 17, to be able to mutually communicate with the display controller 6, the engine controller 7, the transmission controller 8, the brake controller 9, and the steering controller 15.

The image processor 3 may be configured by a microcomputer including a central processing unit (CPU), a read only memory (ROM), and a random access memory (RAM), for example. On the basis of captured image data obtained by the imaging unit 2, the image processor 3 may execute predetermined image processing related to recognition of an environment outside the vehicle. The image processor 3 may perform the image processing by using the memory 4 that is a nonvolatile memory, for example.

The imaging unit 2 may include two cameras that are installed to be able to capture images in a traveling direction of the own vehicle (e.g., a forward direction). Each camera may include a camera optical system and an image sensor such as a charge coupled device (CCD) or a complementary metal oxide semiconductor (CMOS). Each camera may cause the camera optical system to form a subject image on an imaging plane of the image sensor, and acquire, in units of pixels, an electrical signal corresponding to an amount of received light in the image sensor.

Each camera may be installed to be able to measure distances by a so-called stereo imaging method. The electrical signal obtained by each camera may be subjected to A/D conversion and a predetermined correction process, and may be supplied to the image processor 3 as a digital image signal (hereinafter referred to as "captured image data") that indicates, in units of pixels, a luminance value corresponding to a predetermined gray-scale.

The image processor 3 may execute various kinds of image processing based on the pieces of captured image data obtained by the stereo imaging, recognize information related to a three-dimensional object and a lane line, for example, in front of the own vehicle, and estimate a road on which the own vehicle travels (hereinafter referred to as an "own vehicle traveling road") on the basis of such information, for example. Furthermore, the image processor 3 may detect a preceding vehicle and an oncoming vehicle, for example, that are present on the own vehicle traveling road on the basis of the recognized information related to the three-dimensional object, for example.

In one example, the image processor 3 may perform the following process, for example, as a process based on the pieces of captured image data obtained by the stereo imaging.

The image processor 3 may generate distance information on the basis of an amount of shift (i.e., parallax) between corresponding positions of a captured image pair serving as the pieces of captured image data, on the basis of the principle of triangulation. The image processor 3 may perform known grouping on the distance information, and compare the grouped distance information with pre-stored three-dimensional data such as road shape data or three-dimensional object data. The image processor 3 may thereby extract a lane line such as a white line, a sidewall such as a guardrail or a curb, a three-dimensional object such as a vehicle, road marking such as a stop line or a crosswalk, traffic lights, a sign, and a railroad crossing, for example, that are present on a road on which the vehicle travels. On the basis of the extracted information of the lane line, for example, the image processor 3 is able to distinguish between lanes (e.g., traveling lane or oncoming lane).

The image processor 3 may estimate the own vehicle traveling road on the basis of the extracted information of the lane line or the sidewall, for example. In a case where a three-dimensional object is present in front of the own vehicle on the own vehicle traveling road, the image processor 3 may detect, as a preceding vehicle, the three-dimensional object that moves at a predetermined speed in the same direction as the own vehicle. In a case where the preceding vehicle is detected, the image processor 3 may measure an inter-vehicle distance, a relative speed, a vehicle speed, and an acceleration, for example, as information related to the preceding vehicle. The inter-vehicle distance may be calculated as a distance between the own vehicle and the preceding vehicle, for example, as a distance from a front end of the own vehicle to a rear end of the preceding vehicle. The relative speed may be calculated as a relative speed of the preceding vehicle with respect to the own vehicle, for example, as a derivative value of the inter-vehicle distance. Furthermore, the vehicle speed of the preceding vehicle may be calculated by, for example, adding the relative speed to the vehicle speed of the own vehicle. The acceleration of the preceding vehicle may be calculated, for example, as a derivative value of the vehicle speed of the preceding vehicle.

In the example embodiment, the image processor 3 may detect not only the preceding vehicle but also another three-dimensional object, as three-dimensional objects present in front of the own vehicle. For example, in the example embodiment, the image processor 3 may recognize the preceding vehicle as an obstacle, and also recognize, as an obstacle, an oncoming vehicle that has strayed from an oncoming lane onto a traveling lane of the own vehicle if any.

On the basis of the information obtained by the image processor 3, it is possible to specify a front obstacle out of the three-dimensional objects present in front of the own vehicle, and calculate an overlap rate of the front obstacle. The front obstacle according to the example embodiment may include the oncoming vehicle that has strayed onto the traveling lane of the own vehicle, as well as the preceding vehicle.

The overlap rate may be an index indicating a relative positional relationship between the own vehicle and the front obstacle in a lateral direction (or a width direction of the own vehicle) perpendicular to the traveling direction of the own vehicle. In other words, the overlap rate may indicate a rate of overlap between the own vehicle and the front obstacle in the lateral direction. For example, the overlap rate may be set as a value that becomes 100% when a middle position in the lateral direction of the own vehicle and a middle position in the lateral direction of the front obstacle (e.g., the preceding vehicle) overlap in the traveling direction of the own vehicle, decreases as the middle position of the own vehicle and the middle position of the front obstacle deviate from each other in the lateral direction, and becomes 0% when the overlap between the own vehicle and the front obstacle in the lateral direction is eliminated. Here, in a case where there is an oncoming vehicle that is straying from an oncoming lane onto the traveling lane of the own vehicle for passing, for example, the overlap rate calculated regarding the oncoming vehicle as a front obstacle may increase as the oncoming vehicle strays more greatly.

The image processor 3 may calculate the traveling-direction distance between the own vehicle and the front obstacle. The traveling-direction distance may be a distance by which the own vehicle and the front obstacle are separated from each other in the traveling direction of the own vehicle (in the example embodiment, a front direction for the own vehicle), for example, a distance from the front end of the own vehicle to a rear end of the front obstacle.

The image processor 3 may thus recognize an object such as a three-dimensional object that is present around the own vehicle on the basis of an image captured by the imaging unit 2, and also recognize its behavior for a specific three-dimensional object. The image processor 3 may calculate such various kinds of information of an ambient environment for each frame of the captured image data, and sequentially cause the memory 4 to store the calculated information.

The driving assistance controller 5 may be configured by a microcomputer including a CPU, a ROM, and a RAM, for example. The driving assistance controller 5 may execute various kinds of control for driving assistance (hereinafter referred to as "driving assistance control"), on the basis of a result of the image processing by the image processor 3 stored in the memory 4, or detection information and operation input information obtained by the sensors and operating devices 10, for example.

The driving assistance controller 5 may be coupled, via the bus 17, to controllers that are configured by microcomputers as well, e.g., the display controller 6, the engine controller 7, the transmission controller 8, and the brake controller 9, and may be able to mutually communicate with these controllers. The driving assistance controller 5 may transmit an instruction to cause the desired controller out of the controllers to execute operation related to the driving assistance.

As the driving assistance control according to the example embodiment, the driving assistance controller 5 is able to execute lane keep control, automatic braking control, automatic steering control, and cruise control. In the example embodiment, as the lane keep control, control of keeping the own vehicle on its traveling lane may be executed. Furthermore, as the automatic braking control, brake control for collision avoidance with an obstacle and a reduction in collision damage (autonomous emergency braking, hereinafter referred to as "AEB") may be executed. As the automatic steering control, steering control for collision avoidance with an obstacle and desired brake control (autonomous emergency steering, hereinafter referred to as "AES") may be executed. As the cruise control, control of keeping, between the own vehicle and the preceding vehicle, the inter-vehicle distance corresponding to the vehicle speed of the own vehicle (adaptive cruise control, hereinafter referred to as "ACC") may be executed.

In executing the driving assistance control, in a case of having set a target acceleration or a target stop position of the own vehicle, for example, the driving assistance controller 5 may set, on the basis of these target values, requested torque for the engine controller 7, a brake fluid pressure for the brake controller 9, or a speed change ratio for the transmission controller 8, for example, and output the set value to each controller. The stop position may be controlled by setting a target deceleration, for example. Furthermore, in a case of having set a target steering angle of the own vehicle, the driving assistance controller 5 may output an amount of steering corresponding to the target steering angle to the steering controller 15. The engine controller 7, the brake controller 9, the transmission controller 8, and the steering controller 15 may operate on the basis of the requested torque, the brake fluid pressure, the speed change ratio, and the amount of steering, for example, thereby achieving driving assistance operation.

In the example embodiment, the sensors and operating devices 10 may include a vehicle speed sensor 10a, an engine speed sensor 10b, an accelerator position sensor 10c, a steering angle sensor 10d, a yaw rate sensor 10e, a G sensor 10f, a brake switch 10g, and a millimeter-wave radar 10h, for example. The vehicle speed sensor 10a may detect the actual traveling speed of the own vehicle. The engine speed sensor 10b may detect a speed (i.e., the number of revolutions per unit time) of an engine serving as a driving source of the own vehicle. The accelerator position sensor 10c may detect, as an index of the requested torque for the engine, an accelerator position from an amount of depression of an accelerator pedal by a driver. The steering angle sensor 10d may detect a steering angle of the own vehicle. The yaw rate sensor 10e may detect a rate of change in a yaw angle (i.e., a yaw rate) of the own vehicle. The G sensor 10f may detect an acceleration of the own vehicle. The brake switch 10g may be turned ON/OFF depending on operation/non-operation of a brake pedal, and output a signal corresponding to the ON/OFF.

To sense a situation outside the vehicle, the millimeter-wave radar 10h may be installed to be able to emit radio waves of a predetermined wavelength in each of directions in which the situation is to be sensed or monitored, e.g., in the traveling direction of the own vehicle in the example embodiment. The millimeter-wave radar 10h makes it possible to detect a distance of a target that is away from the own vehicle, and relative speed and angle of the target with respect to the own vehicle. This enables sensing of, for example, a vehicle speed, an acceleration, and a steering situation, such as a right/left turn, of the preceding vehicle or the oncoming vehicle.

Although not illustrated, the sensors and operating devices 10 may also include, as other sensors, an intake air amount sensor that detects an amount of intake air to the engine, a throttle position sensor that detects a position of a throttle valve, a water temperature sensor that detects a temperature of engine cooling water, an outside air temperature sensor that detects a temperature outside the vehicle, and a gradient sensor that detects a gradient of the own vehicle traveling road, for example.

Furthermore, the sensors and operating devices 10 may also include, as other operating devices, an ignition switch, an operating device, a select lever, and a display switch, for example. The ignition switch may give an instruction for start/stop of the engine. The operating device may perform an operation related to the driving assistance control. The select lever may select automatic shift mode/manual shift mode in an automatic transmission, and give an instruction for shift up/down during the manual shift mode. The display switch may switch display information on a multi-function display (MFD) provided in the display 11.

The display 11 may include various meters, including a speedometer and a tachometer, that are provided in a meter panel installed in a cabin, and a display device that displays information to the driver or a passenger, such as the MFD. The MFD is able to display various kinds of information, including a cumulative travel distance of the own vehicle, an outside air temperature, and instantaneous fuel consumption, simultaneously or while switching between them.

The display controller 6 may control display operation by the display 11, on the basis of a detection signal from a predetermined sensor and operation input information inputted by an operating device, for example, in the sensors and operating devices 10. It is possible for the display controller 6 to cause the display 11 (e.g., a predetermined region of the MFD) to display a predetermined heads-up message, as part of the driving assistance, on the basis of an instruction from the driving assistance controller 5.

The engine controller 7 may control the engine-related actuator 12, on the basis of a detection signal from a predetermined sensor and operation input information inputted by an operating device, for example, in the sensors and operating devices 10. In the example embodiment, the engine-related actuator 12 may include various actuators related to engine control, including a throttle actuator that drives the throttle valve and a solenoid actuator that drives a fuel injector.

The engine controller 7 may perform control for start/stop of the engine, in response to operation of the ignition switch. Furthermore, the engine controller 7 may control fuel injection timing, a fuel injection pulse width, and a throttle position, for example, on the basis of detection signals from predetermined sensors, including the engine speed sensor 10b and the accelerator position sensor 10c.

On the basis of the speed change ratio of the automatic transmission, and the requested torque set on the basis of the accelerator position and the engine speed, for example, the engine controller 7 may calculate a target throttle position by map searching, for example, and control the throttle actuator to control output torque of the engine on the basis of the calculated target throttle position.

The transmission controller 8 may control the transmission-related actuator 13, on the basis of a detection signal from a predetermined sensor and operation input information inputted by an operating device, for example, in the sensors and operating devices 10. In the example embodiment, the transmission-related actuator 13 may include various actuators related to speed change control, such as a hydraulic control actuator that controls an oil pressure for speed change operation.

In a case where the automatic shift mode is selected by the select lever, the transmission controller 8 may output, to the transmission-related actuator 13, a speed change signal for execution of speed change based on a predetermined speed change pattern. In a case where the manual shift mode is selected, the transmission controller 8 may output, to the transmission-related actuator 13, a speed change signal for execution of speed change in response to a shift up/down instruction given by the select lever.

In a case where the automatic transmission is a continuously variable transmission (CVT), the transmission controller 8 may perform, as the speed change control when the automatic shift mode is set, control of changing the speed change ratio continuously or steplessly.

The brake controller 9 may control the brake-related actuator 14, on the basis of a detection signal from a predetermined sensor and operation input information inputted by an operating device, for example, in the sensors and operating devices 10. In the example embodiment, the brake-related actuator 14 may include various actuators related to brake control, such as a fluid pressure control actuator that controls an output fluid pressure from a brake booster to a master cylinder or a fluid pressure in a brake fluid pipe.

The brake controller 9 may perform control corresponding to an amount of depression of a brake pedal by the driver, and also control the brake-related actuator 14, as the driving assistance control, on the basis of fluid pressure instruction information outputted from the driving assistance controller 5.

The steering controller 15 may calculate target steering torque corresponding to the target amount of steering outputted from the driving assistance controller 5, and control the steering-related actuator 16 on the basis of the calculated target steering torque.

Figure 2:
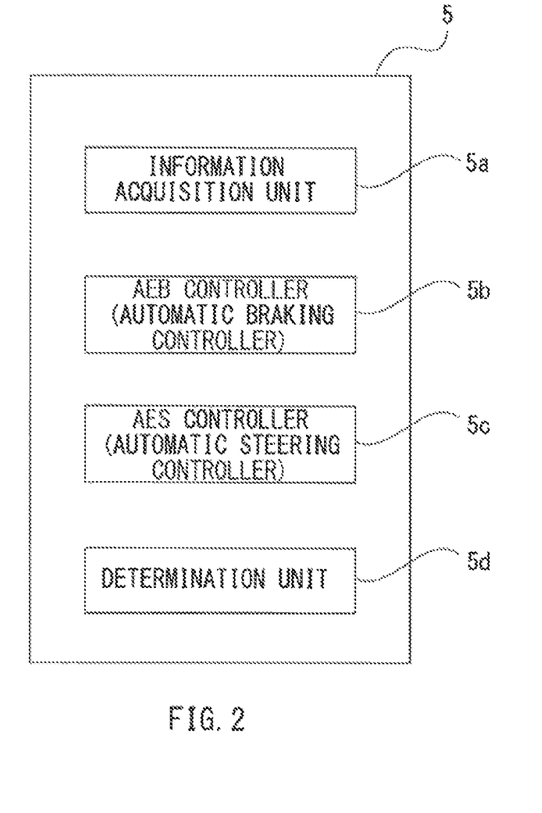
FIG. 2 is a block diagram illustrating a configuration of a driving assistance controller of the vehicle control apparatus according to the example embodiment.

FIG. 2 illustrates a configuration provided in the driving assistance controller 5 in relation to the driving assistance control according to the example embodiment.

The driving assistance controller 5 may include an information acquisition unit 5a, an AEB controller (automatic braking controller) 5b, an AES controller (automatic steering controller) 5c, and a determination unit 5d. In the example embodiment, one or more of the information acquisition unit 5a, the AEB controller 5b, the AES controller 5c, and the determination unit 5d may be implemented by software. In one embodiment, the determination unit 5d may serve as a "determination unit". In one embodiment, the AEB controller 5b and the AES controller 5c may serve as an "automatic controller". As will be described later, a "time-to-collision acquisition unit" and a "overlap rate acquisition unit" may be implemented by the determination unit 5d in one embodiment, but also may be implemented as or by an element that is different from the determination unit 5d. For example, the "overlap rate acquisition unit" may be incorporated in the image processor 3. In one embodiment, the information acquisition unit 5a may serve as an "information acquisition unit".

The information acquisition unit 5a may acquire ambient information related to the own vehicle. In one example, the information acquisition unit 5a may sense or interpret an ambient environment, an obstacle (including a preceding vehicle or an oncoming vehicle if any), and a road situation, for example, on the basis of information of the ambient environment recognized by the image processor 3, information detected by the millimeter-wave radar 10h, or other information. For example, in a case where there is a front obstacle (e.g., a preceding vehicle or an oncoming vehicle), the information acquisition unit 5a may detect a relative speed of the front obstacle with respect to the own vehicle and a distance between the own vehicle and the front obstacle (i.e., traveling-direction distance) in the traveling direction of the own vehicle.

While the own vehicle is traveling, the determination unit 5d may calculate time to collision (TTC) of the own vehicle with the front obstacle, and calculate the overlap rate. The determination unit 5d may perform, on the basis of the calculated TTC and overlap rate, execution determination of the driving assistance control of the own vehicle, including the AEB control (automatic braking control) and the AES control (automatic steering control). The time to collision (TTC) may be time that passes from the current point in time until the time of collision of the own vehicle with the front obstacle, and may be calculated on the basis of the relative speed and the traveling-direction distance, for example, by dividing the traveling-direction distance by the relative speed. It is possible to determine start timing of the AEB control on the basis of the time to collision. In the example embodiment, the TTC to be used in determining the start timing may be corrected to allow the AEB control to be started at earlier timing.

<Contents of Driving Assistance Control>

Description will be given on a process that is executed in relation to the driving assistance control according to the example embodiment in the vehicle control apparatus 1 having the above-described configuration. In the example embodiment, the driving assistance control may assume, for example, a situation in which the oncoming vehicle strays onto the traveling lane of the own vehicle by passing on the oncoming lane, for example, and appropriately execute the AEB control and the AES control under such a situation. In one example, on the basis of the time to collision and the overlap rate, start timing and termination timing of the AEB control may be set, and transition timing from the AEB control to the AES control may be set. In the example embodiment, the termination timing of the AEB control may be regarded as the transition timing to the AES control.

Figure 3:
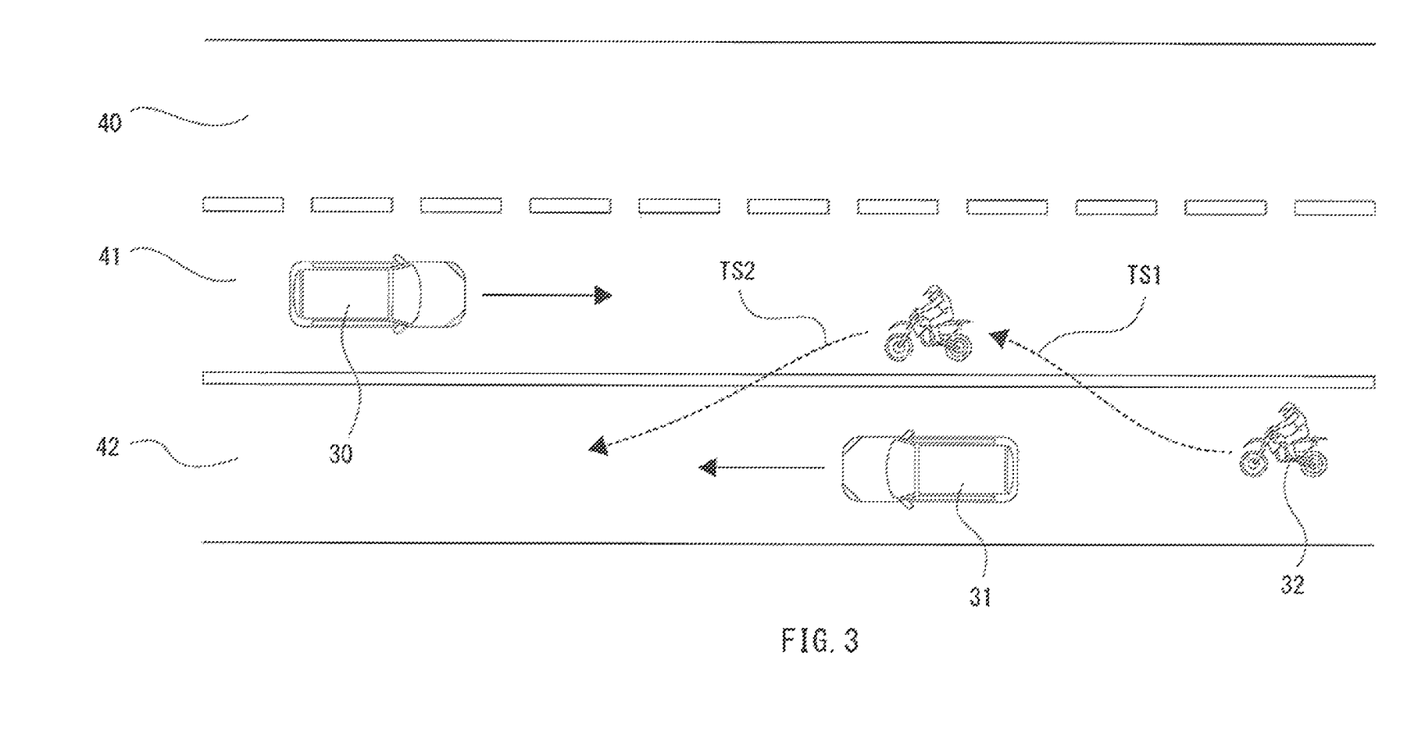
FIG. 3 is an explanatory diagram illustrating a situation in which driving assistance control according to the example embodiment is performed.

FIG. 3 illustrates a situation in which an own vehicle (in the example embodiment, a passenger car) 30 is traveling on a traveling lane 41, and an oncoming vehicle 32 traveling on an oncoming lane 42 has strayed onto the traveling lane 41 to pass another oncoming vehicle 31 in front of the oncoming vehicle 32. FIG. 3 illustrates two lanes 40 and 41 in a direction in which the own vehicle 30 travels, and the own vehicle 30 is assumed to travel on the right lane (e.g., a passing lane) in the traveling direction. Furthermore, in the example embodiment, assume that the oncoming vehicle 32 is a motorcycle (hereinafter referred to as an "oncoming passing vehicle") and is about to pass the oncoming vehicle 31 (hereinafter simply referred to as an "oncoming vehicle") traveling in front of the oncoming passing vehicle 32. The oncoming vehicle 31 may be a passenger car, for example.

When passing the oncoming vehicle 31, the oncoming passing vehicle 32 may first change the traveling direction from a straight-ahead direction, and stray from the oncoming lane 42 onto the traveling lane 41. The oncoming passing vehicle 32 may continue acceleration while approaching the oncoming vehicle 31 to pass the oncoming vehicle 31, and thereafter change the traveling direction again to return to the oncoming lane 42 that is the original lane. Here, a period TS1 may indicate a period in which the oncoming passing vehicle 32 changes the traveling direction and a width by which the oncoming passing vehicle 32 strays onto the traveling lane 41 (hereinafter referred to as an "amount of straying" in some cases) increases. A period TS2 may indicate a period in which the amount of straying decreases and the oncoming passing vehicle 32 returns to the original lane. In such a situation, the driving assistance controller 5 (e.g., the determination unit 5d) may recognize the oncoming passing vehicle 32 as a front obstacle with respect to the own vehicle 30.

As mentioned above, in the period TS1 in which the oncoming passing vehicle 32 strays onto the traveling lane 41 of the own vehicle 30, the overlap rate of the oncoming passing vehicle 32 with respect to the own vehicle 30 may gradually increase. In the period TS1, in a case where the oncoming passing vehicle 32 accelerates for passing, the relative speed of the oncoming passing vehicle 32 with respect to the own vehicle 30 may also increase.

In general, such a situation is presumably a situation in which the risk of collision increases for the own vehicle 30. However, a driver of the oncoming passing vehicle 32 may perform driving to return to the original lane after the passing, and may perform driving to avoid collision with the own vehicle 30 during the passing. Therefore, the oncoming passing vehicle 32 rarely reaches a position right in front of the own vehicle 30 in the lateral direction. The overlap rate tends to gradually increase, but often may remain relatively small. In a case where the overlap rate is small, the risk of collision can be evaluated incorrectly, which can delay start of the AEB control.

In contrast, in the period TS2 in which the oncoming passing vehicle 32 finishes the passing and returns to the oncoming lane 42, the overlap rate of the oncoming passing vehicle 32 with respect to the own vehicle 30 may gradually decrease. Such a situation may be a situation in which the risk of collision decreases. If the AEB control is continued in spite of low risk of collision, braking force (e.g., a deceleration) acting on the own vehicle 30 can conversely impair comfort of an occupant, and cause the risk of rear-end collision of the own vehicle with a subsequent vehicle.

To address this issue, the example embodiment enables appropriate execution of the driving assistance control (e.g., the automatic braking control and the automatic steering control), even in a situation in which an oncoming vehicle strays onto the traveling lane of the own vehicle by passing on an oncoming lane.

Figure 4:
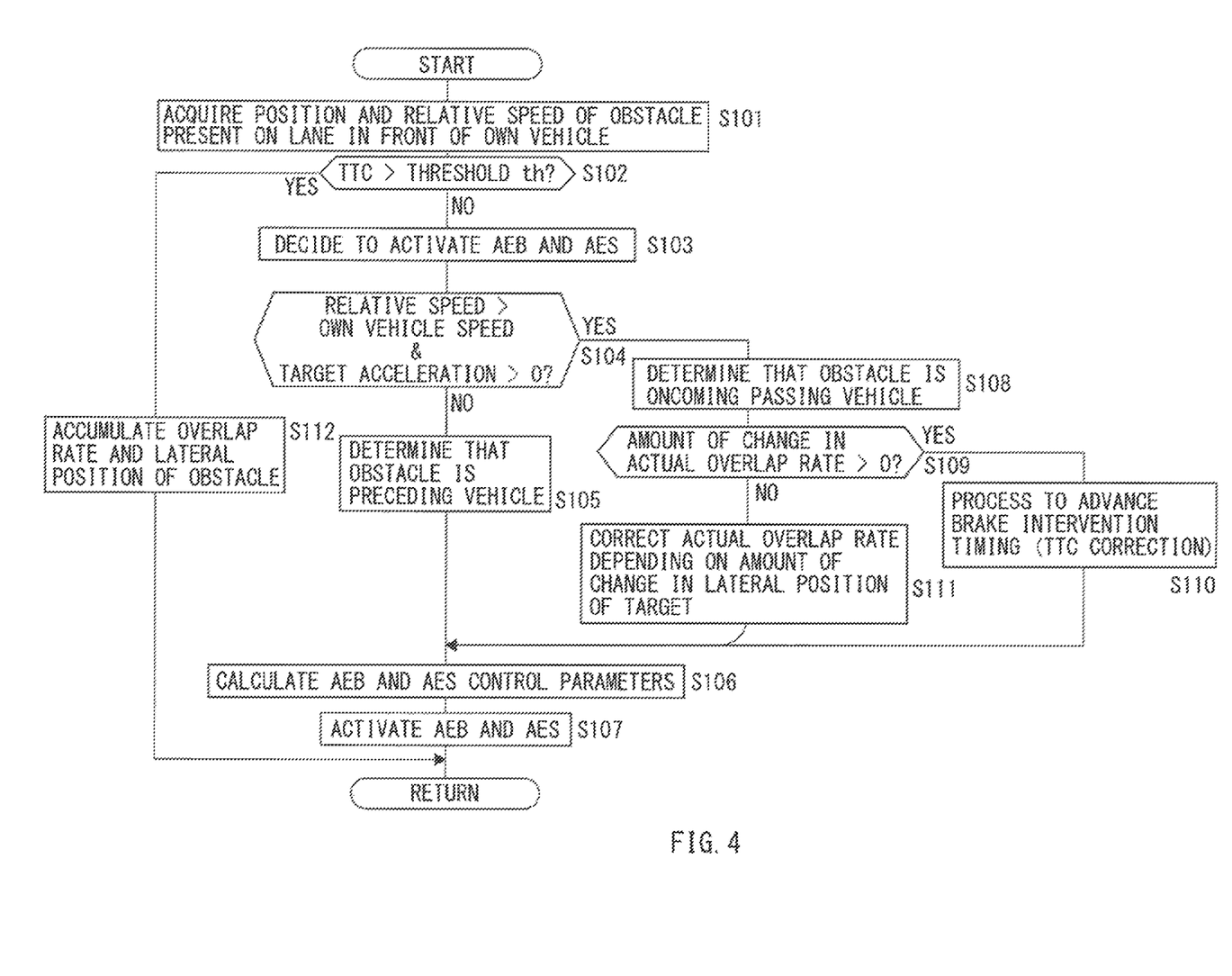
FIG. 4 is a flowchart illustrating contents of the driving assistance control (AEB and AES) according to the example embodiment.

FIG. 4 is a flowchart illustrating contents of the driving assistance control according to the example embodiment.

Processes illustrated in steps in FIG. 4 may be executed by the information acquisition unit 5a, the AEB controller 5b, the AES controller 5c, and the determination unit 5d (the time-to-collision acquisition unit and the overlap rate acquisition unit) illustrated in FIG. 2. The driving assistance controller 5 may repeatedly execute the processes in FIG. 4 in a predetermined cycle while the own vehicle 30 is traveling.

In step S101, the driving assistance controller 5 may acquire information of an ambient environment (i.e., ambient information). For example, the driving assistance controller 5 may acquire, as the ambient information, a position and a relative speed of the front obstacle that is present on the traveling lane 41 of the own vehicle 30. The position of the front obstacle may include both a longitudinal position that is sensed as the traveling-direction distance of the front obstacle, and a lateral position that is related to calculation of the overlap rate. In one embodiment, the "information acquisition unit" may be implemented by the process in step S101.

In step S102, the driving assistance controller 5 may calculate the TTC on the basis of the relative speed and the longitudinal position (i.e., the traveling-direction distance) of the front obstacle acquired in step S101, and determine whether the TTC is greater than a predetermined threshold th. In one embodiment, the "time-to-collision acquisition unit" may be implemented by the process in step S102.

The threshold th may be a threshold serving as a condition in performing execution determination of the AEB control and the AES control. The threshold th may be used in common to both the AEB control and the AES control, or may be individually set for each of them.

Here, conditions for execution of the AES control may also include whether collision is safely avoidable by steering and desired braking. Therefore, in the execution, conditions other than the TTC may also be checked, such as a relationship between a width of the traveling lane 41 and the overlap rate, a situation of the traveling lane 40, and an ambient situation such as another vehicle or an obstacle, for example. In other words, the check of the TTC related to the AES control may be intended to check whether a situation in which the AES control is to be executed has been reached in terms of the TTC in a case where other conditions are satisfied.

On the other hand, in the AEB control, it may be checked whether a situation in which the AEB control is to be executed has been reached mainly on the basis of the TTC, but another condition other than the TTC may be checked.

FIG. 4 briefly illustrates the various situations described above. In step S102 in FIG. 4, it may be determined whether at least one of the AEB control or the AES control is to be executed in terms of the TTC. However, various examples may be assumed depending on an algorithm of the execution determination of the AEB control and the AES control.

In a case where the TTC is greater than the threshold th, i.e., a case where the time to collision is sufficiently long (YES in step S102), the process may proceed to step S112. In a case where the TTC is equal to or less than the threshold th (NO in step S102), the process may proceed to step S103.

In step S112, the driving assistance controller 5 may accumulate data of the overlap rate and the lateral position of the front obstacle (e.g., the oncoming passing vehicle 32), and terminate the control based on this routine (return). In this case, it may be determined that there is still margin before the time of collision with the front obstacle, and the process may not reach a stage of substantially determining whether to perform the AEB control and the AES control.

Accumulating the overlap rate in step S112 makes it possible to check a change in the overlap rate of the front obstacle. For example, an increase in the overlap rate may indicate a situation in which the oncoming passing vehicle 32 that is the front obstacle is straying onto the traveling lane 41 of the own vehicle 30 for passing, for example, as in the period TS1 illustrated in FIG. 3. On the other hand, a decrease in the overlap rate may indicate a situation in which the oncoming passing vehicle 32 has finished the passing and is returning to the original oncoming lane 42, as in the period TS2 illustrated in FIG. 3.

In step S103, the driving assistance controller 5 may determine that the own vehicle 30 has approached the front obstacle enough to cause the risk of collision, and decide to enter a stage of activating the AEB control and the AES control. In subsequent steps, the driving assistance controller 5 may determine timing related to the activation of the AEB control and the AES control. In the example embodiment, the timing related to the activation may be the start timing and the termination timing of the AEB control, and the transition timing from the AEB control to the AES control.

In step S104, the driving assistance controller 5 may determine an attribute or a category of the front obstacle. In one example, the driving assistance controller 5 may compare the relative speed of the front obstacle with respect to the own vehicle 30 with the vehicle speed of the own vehicle 30, and also check the acceleration of the front obstacle (hereinafter referred to as a "target acceleration" in some cases). In a case where the relative speed is greater than the vehicle speed of the own vehicle 30 and the target acceleration is greater than 0 (YES in step S104), the process may proceed to step S108. In a case where this condition is not satisfied, i.e., a case the relative speed is equal to or less than the vehicle speed of the own vehicle 30 or a case where the target acceleration is equal to or less than 0 (NO in step S104), the process may proceed to step S105.

Here, in a case where the relative speed is greater than the vehicle speed of the own vehicle 30 and the target acceleration is greater than 0, it is possible to estimate that the front obstacle with which collision is to be avoided is an oncoming vehicle, and that the oncoming vehicle is accelerating.

In step S108, the driving assistance controller 5 may determine that the front obstacle is the oncoming passing vehicle 32.

In a case where the relative speed is equal to or less than the vehicle speed of the own vehicle 30 or a case where the target acceleration is equal to or less than 0, it is possible to estimate that the front obstacle with which collision is to be avoided is not an oncoming passing vehicle, i.e., is a preceding vehicle.

In step S105, the driving assistance controller 5 may determine that the front obstacle is a preceding vehicle.

In step S106, the driving assistance controller 5 may calculate parameters for the AEB control or the AES control corresponding to collision avoidance with the preceding vehicle. In one example, in the AEB control, the driving assistance controller 5 may determine brake intervention timing that is start timing of braking control, and calculate a deceleration corresponding to the target stop position, for example, as the parameters on an as-needed basis. In the AES control, the driving assistance controller 5 may determine steering intervention timing that is start timing of steering control, and calculate an amount of steering, a steering direction, and a deceleration, for example, as the parameters on an as-needed basis.

In step S107, the driving assistance controller 5 may execute the AEB control or the AES control, on the basis of the determined timing and the calculated parameters in step S106. As mentioned above, brake control may be executed in the AEB control, and steering control and desired brake control may be executed in the AES control. This enables braking or steering corresponding to a behavior of the preceding vehicle to be executed.

In step S109, the driving assistance controller 5 may acquire the actual overlap rate, with respect to the own vehicle 30, of the oncoming passing vehicle 32 that is the front obstacle, and calculate an amount of change in the actual overlap rate. The "actual overlap rate" herein may be used to be distinguished from a corrected overlap rate to be described later. The driving assistance controller 5 may determine whether the calculated amount of change in the actual overlap rate is greater than 0. This is determinable by using information accumulated in most recent step S112. In one embodiment, the "overlap rate acquisition unit" may be implemented by the process in step S109. In one embodiment, the "determination unit" may be implemented by the processes in steps S109, S110, S111, and S106.

As mentioned above, in a case where the actual overlap rate is increasing and the amount of change is a positive value (YES in step S109), it may be determined that the period TS1 illustrated in FIG. 3 is ongoing, i.e., that a period is ongoing in which the oncoming passing vehicle 32 is straying onto the traveling lane 41 of the own vehicle 30, and the process may proceed to step S110. In contrast, in a case where there is no change in the actual overlap rate or a case where the amount of change in the actual overlap rate if any is a negative value, i.e., the actual overlap rate is decreasing (NO in step S109), it may be determined that the period TS2 illustrated in FIG. 3 is ongoing, i.e., that a period is ongoing in which the oncoming passing vehicle 32 has finished the passing and is returning to the oncoming lane 42, and the process may proceed to step S111. In the example embodiment, a case where there is no change in the actual overlap rate, i.e., a case where the amount of change in the actual overlap rate is zero (0), may be regarded as a case where the increase in the actual overlap rate stops and the oncoming passing vehicle 32 begins to return to the original lane, and it may be determined that the period TS2 is ongoing. Alternatively, the case where the amount of change in the actual overlap rate is 0 may be regarded as the period TS1, and the process may proceed to step S110.

In step S110, the driving assistance controller 5 may make the brake intervention timing in the AEB control earlier. In other words, the driving assistance controller 5 may perform a process to allow the brake intervention timing to be determined as earlier timing than when the actual overlap rate is not increasing. For example, the brake intervention timing may be allowed to be determined as earlier timing, before the time of collision with the front obstacle, than during normal control (e.g., control with respect to the preceding vehicle, such as ACC). Alternatively, the brake intervention timing may be allowed to be determined as earlier timing than brake intervention timing that is determined in a case where conditions other than the amount of change in the actual overlap rate are the same, for example, brake intervention timing that is determined in collision avoidance with an oncoming vehicle involving no increase in the actual overlap rate.

Figure 5:
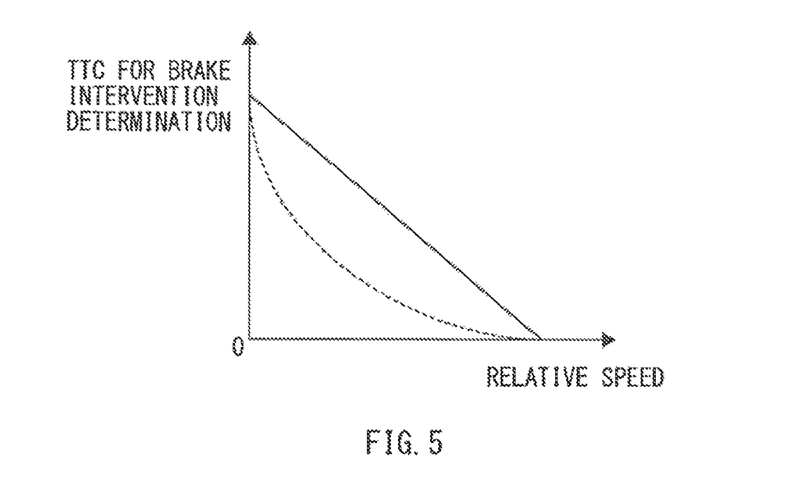
FIG. 5 is an explanatory diagram illustrating an example of correction of advancing brake intervention timing in the driving assistance control according to the example embodiment.

FIG. 5 is an explanatory diagram illustrating an example of correction of advancing the brake intervention timing. FIG. 5 illustrates, along the horizontal axis, the relative speed of the front obstacle (the oncoming passing vehicle 32) with respect to the own vehicle, and illustrates TTC for brake intervention determination along the vertical axis.

The TTC for brake intervention determination may be TTC to be used in determining the brake intervention timing, and normally may be the above-described TTC that is obtained from the traveling-direction distance and the relative speed. The brake intervention timing in the AEB control, i.e., timing to begin braking, is determinable mainly on the basis of the TTC. In the example embodiment, in the AEB control, it may be determined that the brake intervention timing has arrived at a point in time when the TTC decreases to reach a predetermined value. In determining the brake intervention timing, the actual overlap rate may be taken into consideration in addition to the TTC. In other words, the actual overlap rate being within a predetermined range may be adopted as a condition for the brake intervention determination on the basis of the TTC.

In the example embodiment, in step S110, the driving assistance controller 5 may correct the TTC itself. For example, as indicated by a broken line in FIG. 5, the TTC may be corrected to be a smaller value with respect to an increase in the relative speed. In the example embodiment, the TTC may be corrected to achieve a relationship in which the TTC decreases in a quadratic curve with respect to the increase in the relative speed.

After correcting the TTC for brake intervention determination, the driving assistance controller 5 may proceed to step S106, and calculate parameters for the AEB control. Here, in step S106 after the correction in step S110, whether the brake intervention timing has arrived may be determined on the basis of the TTC for brake intervention determination that has been corrected to decrease (a time period shorter than that during normal control), by comparison with a predetermined value. This makes it more likely to be determined that the brake intervention timing has arrived, allowing the brake intervention timing to be determined as earlier timing.

It is to be noted that the TTC corrected in step S110 may be used only in determination of the brake intervention timing. In step S106, TTC may also be used in calculation of parameters, including the target stop position and a brake fluid pressure corresponding to the target stop position, but the TTC to be used in the calculation of the parameters may be uncorrected intrinsic TTC.

In step S107, the driving assistance controller 5 may execute the AEB control on the basis of the determined timing and the set parameters in step S106, and transition to the AES control on an as-needed basis after termination of the AEB control. In one embodiment, the "automatic controller" may be implemented by the process in step S107.

It is to be noted that even after the TTC for brake intervention determination is corrected in step S110, the process may still proceed to step S110 in the period TS1. In this case, the actual TTC at that point in time may be corrected similarly for calculation of the TTC for brake intervention determination, and whether the brake intervention timing has arrived may be determined on the basis of the corrected TTC. However, in a case where it has already been determined that the brake intervention timing has arrived and braking control has been started, there is no need to make determination by the corrected TTC. Accordingly, it is possible to omit the correction, i.e., skip the process in step S110, even in a case of proceeding to step S110.

In step S111, the driving assistance controller 5 may correct the actual overlap rate depending on an amount of change in the lateral position of the front obstacle (in the example embodiment, referring to an amount of change per unit time, i.e., a rate of change in the lateral position). In the example embodiment, the actual overlap rate may be corrected by calculating an overlap rate correction factor.

Figure 6:
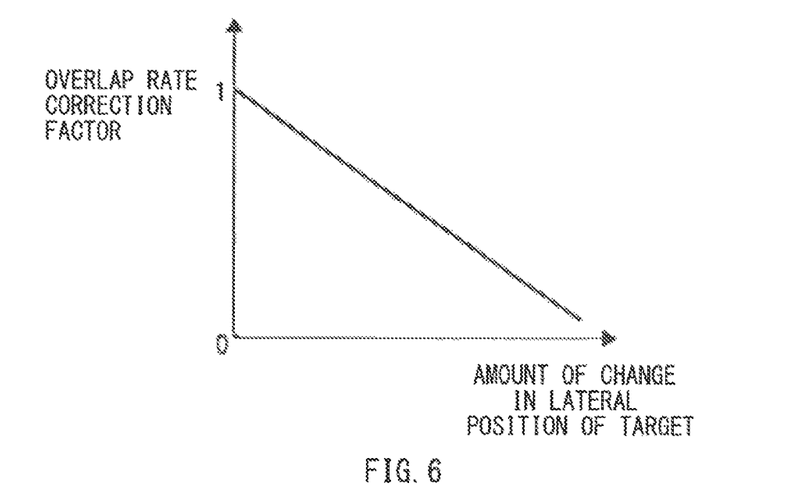
FIG. 6 is an explanatory diagram illustrating an example of correction of advancing brake termination timing or control transition timing in the driving assistance control according to the example embodiment.

FIG. 6 illustrates the amount of change in the lateral position of the front obstacle along the horizontal axis, and illustrates the overlap rate correction factor along the vertical axis. Table data having such a tendency may be searched on the basis of the amount of change in the lateral position, the overlap rate correction factor thereby being calculated. In the example embodiment, the overlap rate correction factor may take a value that is equal to or less than 1. The overlap rate correction factor may be 1 in a case where the amount of change in the lateral position is 0, and decrease as the amount of change in the lateral position increases. The current overlap rate (actual overlap rate) may be corrected into a corrected overlap rate by multiplying the current overlap rate by the calculated overlap rate correction factor.

Here, the correction of the actual overlap rate in step S111 may be correction to make it easier to terminate the AEB control. In other words, in the example embodiment, the actual overlap rate may be corrected to make brake termination timing in the AEB control earlier, i.e., allow the brake termination timing to be determined as earlier timing than when the actual overlap rate is not decreasing. In a case where the actual overlap rate is small, for example, a case where the actual overlap rate decreases to reach a predetermined value, it is determinable that the possibility of collision has decreased and the AEB control has become unnecessary. Accordingly, correcting the actual overlap rate to reduce the actual overlap rate into the corrected overlap rate makes it more likely to be determined that the AEB control is to be terminated. This makes it possible to determine the brake termination timing as earlier timing than brake termination timing that is determined in a case where conditions other than the amount of change in the actual overlap rate are the same, for example, brake termination timing that is determined in collision avoidance with an oncoming vehicle involving no decrease in the actual overlap rate.

Furthermore, in the example embodiment, the correction of the actual overlap rate in step S111 may make it easier to enter the AES control, i.e., make transition timing from the AEB control to the AES control earlier. In one example, it is possible to determine the transition timing as earlier timing than transition timing that is determined when the actual overlap rate is not decreasing, for example, in a case where conditions other than the amount of change in the actual overlap rate are the same. In a case where the actual overlap rate is high, there is no space to escape to in avoiding collision by steering within the same lane, for example. This makes it less likely to be determined that steering by the AES control is activatable. In contrast, in a case where the actual overlap rate is small, there may be space to escape to, for example. This makes it more likely to be determined that collision avoidance by steering within the same lane is possible, allowing steering intervention conditions in the AES control to be easily satisfied. Accordingly, correcting the actual overlap rate to reduce the actual overlap rate makes it easier to enter the AES control.

After correcting the actual overlap rate, the driving assistance controller 5 may proceed to step S106, and calculate parameters of the AEB control or the AES control. During the AEB control, the brake termination timing in the AEB control may also be determined in step S106. In the determination of the brake termination timing, the corrected overlap rate may be referenced. Referencing the corrected overlap rate allows the brake termination timing to be determined as earlier timing. In the AES control, referencing the corrected overlap rate makes it more likely to be determined that the AES control is to be started. In other words, referencing the corrected overlap rate smaller than the actual overlap rate makes it more likely to be determined that collision is easily avoidable by steering, allowing the steering intervention timing in the AES control to be determined as earlier timing. For example, in a case where the corrected overlap rate decreases to a predetermined value during the AEB control, steering intervention conditions in the AES control may be satisfied. It may thus be determined that the steering intervention timing has arrived, which makes it possible to terminate the AEB control and start the AES control.

It is to be noted that the corrected overlap rate calculated in step S111 may be used only in determination of the brake termination timing and determination of the steering intervention timing. The actual overlap rate may be used in calculation of parameters for actual steering intervention, for example, the target steering angle.

Thereafter, in step S107, the driving assistance controller 5 may execute the AEB control and the AES control, by using the parameters calculated in step S106. Here, in a case of having determined that the brake termination timing has arrived, the driving assistance controller 5 may terminate the AEB control in step S107. In a case of having determined that the steering intervention timing has arrived, the driving assistance controller 5 may execute the AES control in step S107. In the example embodiment, the driving assistance controller 5 may switch the driving assistance control from the AEB control to the AES control by determining that the steering intervention timing in the AES control has arrived during the AEB control.

<Example Effects of Example Embodiment>

In the example embodiment, assume a case where a vehicle (e.g., a two-wheeled vehicle) traveling on an oncoming lane has strayed onto the traveling lane of the own vehicle for passing. In this case, the relative speed may increase because the two-wheeled vehicle accelerates for passing, whereas the overlap rate with respect to the own vehicle tends to remain relatively small. The small overlap rate can cause a delay in determination of the risk of collision. Moreover, the relative speed has become high by the time of the actual determination, which can make collision avoidance by the automatic braking control difficult. The example embodiment makes it possible to address such a situation appropriately.

In the example embodiment, the time to collision indicates a time period until a time of collision of the own vehicle 30 with the oncoming passing vehicle 32 that is a front obstacle of the own vehicle 30. The time to collision is acquired, and the overlap rate (in the example embodiment, the actual overlap rate) of the oncoming passing vehicle 32 with respect to the own vehicle 30 is acquired. Execution determination of the automatic braking control is performed on the basis of the time to collision and the overlap rate. When the overlap rate is increasing, the brake intervention timing in the AEB control is determined as earlier timing than when the overlap rate is not increasing, and the AEB control is executed at the determined brake intervention timing.

Thus, even though the overlap rate is small, and determination based on only the overlap rate can delay start of the AEB control, attention may be focused on a tendency of a change in the overlap rate during the passing, and control for collision avoidance may be appropriately performed by a process of advancing determination of the brake intervention timing (in the example embodiment, correction of the TTC). This makes it possible to more reliably avoid collision with the oncoming passing vehicle 32.

In some example embodiments, when the overlap rate is increasing, the TTC (time to collision) may be corrected (e.g., corrected to decrease), and the brake intervention timing may be determined on the basis of the corrected TTC. Thus, the TTC may be a value that makes it more likely to be determined that the AEB control is to be started than the actual TTC. This enables the brake intervention timing to be advanced. In other words, correcting the TTC makes it is possible to advance the brake intervention timing without greatly changing an algorithm of the AEB control, for example, while keeping a normal algorithm of the AEB control.

In some example embodiments, when the overlap rate is increasing, the TTC to be used in determining the brake intervention timing may be corrected to achieve a relationship in which the TTC decreases in a quadratic curve as the relative speed of the oncoming passing vehicle 32 with respect to the own vehicle 30 increases (e.g., a relationship indicated by the broken line in FIG. 5). Thus, when the overlap rate is increasing, even in a case where the relative speed is low, it is possible to relatively greatly shorten the TTC (in terms of control, make correction in a direction in which temporal margin to the time of collision decreases), making it possible to reliably advance the brake intervention timing. Here, in a case where the relative speed is high, the TTC itself directly obtained from the traveling-direction distance and the relative speed is short. It is therefore possible to determine the brake intervention timing as early timing, without making great correction. In contrast, in a case where the TTC is relatively long, even if the brake intervention timing is timing providing sufficient margin in normal collision avoidance, it may be insufficient in terms of avoiding collision with the oncoming passing vehicle 32, causing a delay. In such a case, the TTC for determination may be corrected to decrease in a quadratic curve with respect to an increase in the relative speed. This makes it possible to perform control for collision avoidance with the oncoming passing vehicle 32 more appropriately, regardless of the relative speed.

In some example embodiments, when the overlap rate is decreasing, the brake termination timing in the AEB control may be allowed to be determined as earlier timing than when the overlap rate is not decreasing, and the AEB control may be terminated at the determined brake termination timing.

For example, in a case where the oncoming passing vehicle 32 that has strayed onto the traveling lane 41 of the own vehicle 30 finishes passing and returns to the oncoming lane 42, the risk of collision tends to decrease. In this case, if the AEB control is continued even though the risk of collision has sufficiently decreased, unnecessary brake operation goes on to impair comfort of the occupant, and excessive continuation of braking increases the risk of rear-end collision with a subsequent vehicle. Hence, in a situation in which passing ends, for example, and the possibility of collision with the oncoming passing vehicle 32 decreases, the AEB control may be terminated earlier. This makes it possible to improve comfort, and also enhance safety against rear-end collision.

In the example embodiment, execution determination of the driving assistance control of the own vehicle 30, including the AEB control and the AES control, are performed on the basis of the time to collision and the overlap rate. On the basis of a result of the execution determination, the driving assistance control is caused to transition from the AEB control to the AES control. Here, when the overlap rate is decreasing, transition timing from the AEB control to the AES control is determined as earlier timing than when the overlap rate is not decreasing.

For example, in a case where the oncoming passing vehicle 32 that has strayed onto the traveling lane 41 of the own vehicle 30 finishes passing and returns to the oncoming lane 42, the risk of collision tends to decrease, and the possibility of being able to avoid collision by steering tends to increase. Hence, when the overlap rate is decreasing, transition from the AEB control to the AES control may be performed earlier. This makes it possible to avoid collision by steering. This also enables early switching from collision avoidance by braking (the AEB control) to collision avoidance mainly by steering (the AES control), contributing to suppressing sudden braking. Here, it is possible to estimate from a change in the overlap rate that the oncoming passing vehicle 32 is returning to the original lane (the oncoming lane 42), and execute steering and desired braking (i.e., deceleration) corresponding to operation of the oncoming passing vehicle 32 returning to the original lane. Furthermore, in the AES control after the transition, the amount of steering and the steering direction may be corrected depending on the possibility of collision with the oncoming passing vehicle 32. In this case, it is possible to adopt, as an index of the possibility of collision, an amount of change in the lateral position or an amount of change (e.g., a rate of decrease) in the actual overlap rate of the oncoming passing vehicle 32.

As described above, according to the example embodiment, it is possible to adjust timing related to the driving assistance control depending on a change in overlap rate, and appropriately perform control for collision avoidance with a front obstacle (e.g., the oncoming passing vehicle 32).

The configuration and the process described above are examples for description. Various modifications and alterations may be made besides the configuration illustrated in FIG. 1 and FIG. 2 and the process illustrated in FIG. 4. In the example embodiment, the driving assistance control is described as control of executing both the AEB control and the AES control, but this is non-limiting. The driving assistance control may also be implemented as control of executing only the AEB control or control of executing only the AES control.

The example embodiment described above describes an example of the vehicle control apparatus in a case where the subject vehicle travels on a road where drivers keep to the left by law. Needless to say, if the vehicle control apparatus is to be applied to a road where drivers keep to the right by law, left and right settings or the like may be appropriately set in an opposite manner.

The driving assistance controller 5 illustrated in FIGS. 1 and 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the driving assistance controller 5. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the driving assistance controller 5 illustrated in FIGS. 1 and 2.

Although some example embodiments and modification examples of the technology are described hereinabove, the foregoing embodiments and modification examples are mere examples and are not intended to limit the scope of the technology. It should be also appreciated that various omissions, replacements, and modifications may be made in the foregoing embodiments and modification examples described herein, without departing from the scope of the technology. The technology is intended to include such modifications and alterations in so far as they fall within the scope of the appended claims or the equivalents thereof.

The invention claimed is:

1. A vehicle control apparatus comprising:
a time-to-collision acquisition unit configured to acquire time to collision that is a time period until a time of collision of an own vehicle with a front obstacle present in front of the own vehicle;
an overlap rate acquisition unit configured to calculate an overlap rate between the own vehicle and the front obstacle based on a relative positional relationship between the own vehicle and the front obstacle in a lateral direction perpendicular to a traveling direction of the own vehicle;
a determination unit configured to:
calculate an amount of change in the overlap rate per predetermined time;
determine whether the amount of change in the overlap rate per predetermined time is positive;
in response to determining that the amount of change in the overlap rate per predetermined time is not positive, i) determine, based on the acquired time to collision, a start timing for starting automatic braking control of the own vehicle, and ii) calculate, based on the acquired time to collision, a target stop position of the own vehicle to be used in the automatic braking control; and
in response to determining that the amount of change in the overlap rate per predetermined time is positive, i) correct the acquired time to collision, ii) determine, based on the corrected time to collision, the start timing for starting the automatic braking control of the own vehicle, wherein the start timing determined based on the corrected time to collision is earlier than the start timing determined based on the acquired time to collision, and iii) calculate, based on the acquired time to collision, a target stop position of the own vehicle to be used in the automatic braking control; and
an automatic controller configured to execute the automatic braking control at the determined start timing and the determined target stop position.

2. The vehicle control apparatus according to claim 1, wherein when the amount of change in the overlap rate per predetermined time is positive, the determination unit corrects the acquired time to collision such that the corrected time of collision becomes shorter than the acquired time of collision.

3. The vehicle control apparatus according to claim 1, wherein the time-to-collision acquisition unit acquires the time to collision based on a linear relationship between the time to collision and a relative speed of the front obstacle, and
wherein when the amount of change in the overlap rate per predetermined time is not positive, the determination unit corrects the time to collision such that the corrected time to collision is based on a quadratic relationship between the time to collision and the relative speed of the front obstacle.

4. The vehicle control apparatus according to claim 1, further comprising an information acquisition unit configured to acquire ambient information related to the own vehicle, including a relative speed of the front obstacle with respect to the own vehicle and a traveling direction distance between the own vehicle and the front obstacle in the traveling direction of the own vehicle,
wherein the time-to-collision acquisition unit is configured to calculate the time to collision on a basis of the relative speed and the traveling direction distance acquired by the information acquisition unit.

5. The vehicle control apparatus according to claim 1, wherein the determination unit is further configured to, when the amount of change in the overlap rate per predetermined time is not positive, determine termination timing of the automatic braking control as an earlier timing than when the amount of change in the overlap rate per predetermined time is positive, and the automatic controller is further configured to terminate the automatic braking control at the termination timing determined by the determination unit.

6. The vehicle control apparatus according to claim 5, wherein the determination unit is configured to, when the amount of change in the overlap rate per predetermined time is not positive, correct the overlap rate acquired by the overlap rate acquisition unit so that the overlap rate decreases, and determine the termination timing on a basis of the corrected overlap rate.

7. The vehicle control apparatus according to claim 5, wherein the automatic controller is further configured to transition from the automatic braking control to automatic steering control of the own vehicle at the termination timing.

8. A vehicle control apparatus comprising:
a time-to-collision acquisition unit configured to acquire time to collision that is a time period until a time of collision of an own vehicle with a front obstacle present in front of the own vehicle;
an overlap rate acquisition unit configured to calculate an overlap rate between the own vehicle and the front obstacle based on a relative positional relationship between the own vehicle and the front obstacle in a lateral direction perpendicular to a traveling direction of the own vehicle;
a determination unit configured to:
  calculate an amount of change in the overlap rate per predetermined time;
  determine whether the amount of change in the overlap rate per predetermined time is positive;
  in response to determining that the amount of change in the overlap rate per predetermined time is positive, determined termination timing of automatic braking control based on the calculated overlap rate; and
  in response to determining that the amount of change in the overlap rate per predetermined time is not positive, i) correct the calculated overlap rate and ii) determine termination timing of the automatic braking control based on the corrected overlap rate, wherein the termination timing determined based on the corrected overlap rate is earlier than the termination timing determined based on the calculated overlap rate; and
an automatic controller configured to terminate the automatic braking control at the termination timing determined by the determination unit.

9. A vehicle control apparatus comprising:
a time-to-collision acquisition unit configured to acquire time to collision that is a time period until a time of collision of an own vehicle with a front obstacle present in front of the own vehicle;
an overlap rate acquisition unit configured to calculate an overlap rate between the own vehicle and the front obstacle based on a relative positional relationship between the own vehicle and the front obstacle in a lateral direction perpendicular to a traveling direction of the own vehicle;
a determination unit configured to perform execution determination of driving assistance control of the own vehicle based on the time to collision and the overlap rate, wherein the driving assistance control includes automatic braking control and automatic steering control; and
an automatic controller configured to cause the driving assistance control of the own vehicle to transition from the automatic braking control to the automatic steering control on a basis of a result of the execution determination by the determination unit,
wherein the determination unit is configured to:
  determine that the acquired time to collision is equal to or less than a threshold;
  calculate an amount of change in the overlap rate per predetermined time;
  determine whether the amount of change in the overlap rate per predetermined time is positive;
  in response to determining that the amount of change in the overlap rate per predetermined time is positive, determine a transition timing from the automatic braking control to the automatic steering control based on the calculated overlap rate; and
  in response to determining that the amount of change in the overlap rate per predetermined time is not positive, i) correct the calculated overlap rate and ii) determine, based on the corrected overlap rate, transition timing from the automatic braking control to the automatic steering control, wherein the transition timing determined based on the corrected overlap rate is earlier than the transition timing determined based on the calculated overlap rate.

* * * * *